(12) United States Patent
Ichii et al.

(10) Patent No.: US 8,375,749 B2
(45) Date of Patent: Feb. 19, 2013

(54) METHOD FOR FABRICATING POROUS SILICA PREFORM

(75) Inventors: Kentaro Ichii, Sakura (JP); Takakazu Gotoh, Sakura (JP); Naritoshi Yamada, Sakura (JP); Koichi Harada, Sakura (JP)

(73) Assignee: Fujikura Ltd., Tokyo (JP)

( * ) Notice: Subject to any disclaimer, the term of this patent is extended or adjusted under 35 U.S.C. 154(b) by 485 days.

(21) Appl. No.: 12/630,440

(22) Filed: Dec. 3, 2009

(65) Prior Publication Data

US 2010/0077800 A1    Apr. 1, 2010

Related U.S. Application Data

(62) Division of application No. 10/983,599, filed on Nov. 9, 2004, now Pat. No. 7,647,792.

(30) Foreign Application Priority Data

Nov. 11, 2003  (JP) ................................. 2003-381074
Nov. 20, 2003  (JP) ................................. 2003-391025

(51) Int. Cl.
    *C03B 37/018*    (2006.01)
(52) U.S. Cl. ............................. 65/414; 65/413; 65/397
(58) Field of Classification Search .............. 65/397, 65/413–415
    See application file for complete search history.

(56) References Cited

U.S. PATENT DOCUMENTS

| 4,627,866 A | 12/1986 | Kanamori et al. |
| 4,668,263 A | 5/1987 | Yokota et al. |
| 6,131,415 A | 10/2000 | Chang et al. |
| 6,928,841 B2 | 8/2005 | Wu |
| 2003/0046960 A1 | 3/2003 | Dawes et al. |
| 2003/0101772 A1 | 6/2003 | Itoh et al. |
| 2003/0200770 A1 | 10/2003 | Johnson |

FOREIGN PATENT DOCUMENTS

| JP | S59-232934 A | | 12/1984 |
| JP | 62162639 A | * | 7/1987 |
| JP | H07-330366 A | | 12/1995 |
| JP | P2999095 B2 | | 5/1999 |
| JP | 2002-47027 A | | 2/2002 |

OTHER PUBLICATIONS

Machine translation of JP 07-025624, Patent No. 2999095, Kosaka Koji, Production of Soot Preform, Jan. 27, 1995.*

Hanawa, F. et al. "Flourine-Doping Mechanism for Silica Glass Particles", IEICE Transactions on Communications, Feb. 1988, pp. 212-220, vol. J71-C, No. 2.

* cited by examiner

*Primary Examiner* — Queenie Dehghan
(74) *Attorney, Agent, or Firm* — Sughrue Mion, PLLC

(57) ABSTRACT

A method for fabricating a porous silica preform includes the steps of supplying fuel gas for generating an oxyhydrogen flame to a glass synthesizing burner; supplying Gas A containing silicon and Gas B containing fluorine to the burner; synthesizing glass particles; and depositing the glass particles around a starting rod, in which when glass particles are deposited directly on the starting rod, a supply of Gas A and a supply of Gas B supplied to the burner are adjusted so that a ratio of the number of fluorine atoms to the number of silicon atoms in the gas supplied to the burner satisfies the following Formula (1):

$$\{(\text{number of F atoms})/(\text{number of Si atoms})\} \leq 0.1 \qquad (1).$$

1 Claim, 6 Drawing Sheets

METHOD FOR FABRICATING POROUS SILICA PREFORM

This application is a divisional application of U.S. application Ser. No. 10/983,599 filed Nov. 9, 2004 which claims priority based on Japanese Patent Application Nos. 2003-381074 filed Nov. 11, 2003 and 2003-391025 filed Nov. 20, 2003. The entire disclosures of the prior applications are hereby incorporated by reference.

BACKGROUND OF THE INVENTION

1. Field of the Invention

This present invention relates to a porous silica perform and method for fabricating a porous silica preform.

Priority is claimed on Japanese Patent Application No. 2003-381074 filed Nov. 11, 2003, and Japanese Patent Application No. 2003-391025, filed Nov. 20, 2003, the contents of which are incorporated herein by reference.

2. Description of Related Art

A method for fabricating a fluorine-doped porous silica preform has been proposed in which glass forming gas and fluorine-containing compound gas are supplied to a glass synthesizing burner, silica soot, e.g., fine particles of glass, are synthesized by hydrolysis or oxidation in an oxyhydrogen flame, and the resultant glass particles are deposited on a starting rod to form a porous silica preform (for example, Vapor-phase Axial Deposition (VAD) method, see Japanese Unexamined Patent Application, First Publication Nos. S59-232934 and H7-330366).

In this method for fabricating a porous silica preform, it is well-known that if the fluorine-containing compound gas is present at a high concentration, the following etching reaction occurs in glass particles and $SiF_4$ is generated as an adsorbed species:

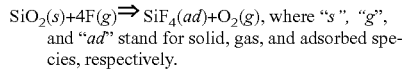
$SiO_2(s)+4F(g) \Rightarrow SiF_4(ad)+O_2(g)$, where "s", "g", and "ad" stand for solid, gas, and adsorbed species, respectively.

The resultant $SiF_4$ weakens the adhesion force between glass particles. Thus, if the fluorine-containing compound gas is present at a high concentration, adhesion force between the starting rod and the glass particles is weakened when glass particles are deposited directly on a starting rod. As a result, the porous silica preform frequently falls off from the starting rod, resulting in a poor yield.

Furthermore, since $SiF_4$ weakens the adhesion force between glass particles, breakage (soot breakage) may frequently occur in a porous silica preform, resulting in a poor yield.

Such a soot breakage tends to occur more frequently in a tail (tip) of a porous silica preform regardless of absence or presence of fluorine dopant when the porous silica preform is cooled after production.

Accordingly, another method for fabricating a porous silica preform was proposed in which upon completion of fabricating a porous silica preform, the temperature of the flame of the burner is increased so that a hardening layer is formed on the surface of an end of a porous silica preform (see Japanese Patent No. 2999095).

Although JP 2999095 teaches that soot breakage can be reduced by heating the surface of a porous silica preform so that the powder density of the hardened layer is no less than 0.3 g/cm³ and no more than 0.5 g/cm³, it does not address issues of a fluorine-doped porous silica preform.

When fabricating a fluorine-doped porous silica preform, an incidence of soot breakage may not be suppressed since a hardened layer may not be effective since the adhesion force between glass particles is reduced, as described above.

As will be discussed later, soot breakage tends to occur when the temperature of deposited glass particles decreases and the glass particles undergo thermal contraction:

(1) Typically, glass particles are synthesized and deposited on a starting rod using plural glass synthesizing burners. Since a boundary between deposition areas of the adjacent burners is distant from the center of the oxyhydrogen flame from a burner, the temperature of the boundary heated by the oxyhydrogen flame is lower. When glass particles which have been deposited on the starting rod pass through such a boundary between deposition areas of each of the burners, the glass particles undergo thermal contraction, resulting in soot breakage.

(2) Upon the completion of deposition of glass particles, as deposited glass particles exits from all of the deposition areas (areas heated by oxyhydrogen flame) of the burners, the temperature of the deposited glass particles decreases and the glass particles undergo thermal contraction, resulting in soot breakage.

Furthermore, as described above, a porous silica preform that is doped with fluorine at a high concentration easily cracks since the adhesion force between glass particles is weak. Therefore, when an optical fiber preform is fabricated from a porous silica preform, a porous silica preform easily cracks, especially while handling of the preform.

SUMMARY OF THE INVENTION

A first aspect of the present invention was conceived in view of the above-mentioned background, and an object thereof is to provide a method for fabricating a fluorine-doped porous silica preform with a high yield.

A first embodiment of a method for fabricating a porous silica preform according to the first aspect of the present invention is a method for fabricating a porous silica preform includes the steps of: supplying fuel gas for generating an oxyhydrogen flame to a glass synthesizing burner; supplying Gas A containing silicon and Gas B containing fluorine to the burner; synthesizing glass particles; and depositing the glass particles around a starting rod, in which when glass particles are deposited directly on the starting rod (i.e. when glass particles are deposited in Zone I shown in FIG. 2), a supply of Gas A and a supply of Gas B supplied to the burner are adjusted so that a ratio of the number of fluorine atoms to the number of silicon atoms in the gas supplied to the burner satisfies the following Formula (1):

$\{(\text{number of F atoms})/(\text{number of Si atoms})\} \leq 0.1$ \hfill (1)

This inhibits an etching reaction, thereby making glass particles strongly adhered to the starting rod and maintaining the adhesion force between glass particles strong.

A second embodiment of a method for fabricating a porous silica preform according to the first aspect of the present invention is a method for fabricating a porous silica preform includes the steps of supplying fuel gas for generating an oxyhydrogen flame to a glass synthesizing burner; supplying Gas A containing silicon and Gas B containing fluorine to the burner; synthesizing glass particles; and depositing the glass particles around a starting rod (i.e. when glass particles are deposited in Zone II shown in FIG. 2), in which a supply of Gas A and a supply of Gas B supplied to the inner burner are adjusted so that a ratio of the number of fluorine atoms to the number of silicon atoms in the gas supplied to the burner satisfies the following Formula (2):

$\{(\text{number of F atoms})/(\text{number of Si atoms})\} \leq 0.3$ \hfill (2)

This inhibits an etching reaction, and the adhesion force between glass particles can be maintained strong.

In the method for fabricating a porous silica preform according to the second embodiment of the first aspect, when glass particles are deposited in Zone I shown in FIG. 2, a supply of Gas A and a supply of Gas B supplied may be adjusted so that a ratio of the number of fluorine atoms to the number of silicon atoms in the gas supplied to the burner satisfies the following Formula (1):

$$\{(\text{number of F atoms})/(\text{number of Si atoms})\} \leq 0.1 \quad (1)$$

This inhibits an etching reaction, thereby making glass particles strongly adhered to the starting rod and maintaining the adhesion force between glass particles strong.

A third embodiment of a method for fabricating a porous silica preform according to the first aspect of the present invention is a method for fabricating a porous silica preform including the steps of: supplying fuel gas for generating an oxyhydrogen flame to a glass synthesizing burner; supplying Gas A containing silicon and Gas B containing fluorine to the burner; synthesizing glass particles; and depositing the glass particles around a starting rod, forming a hardened layer, which is to be a tail of a porous silica preform, a supply of Gas A and a supply of Gas B supplied to the burner are adjusted so that a ratio of the number of fluorine atoms to the number of silicon atoms in the gas supplied to the burner satisfies the following Formula (2):

$$\{(\text{number of F atoms})/(\text{number of Si atoms})\} \leq 0.3 \quad (2)$$

This inhibits an etching reaction at the hardened layer, thereby preventing the adhesion force between glass particles from being weakened. In addition, glass particles are sintered in the oxyhydrogen flame; thus, powder density thereof is increased and the glass particles become firm.

A second aspect of the present invention was conceived in view of the above-mentioned background. and an object thereof is to provide a method for fabricating a porous silica preform with a high yield with less breakage which is crack-resistance to impact and can be easily handled even if the porous silica preform is doped with fluorine at a high concentration.

That is, a first embodiment of the method for fabricating a porous silica preform according to the second aspect of the present invention is a method for fabricating a porous silica preform including the steps of: supplying fuel gas to plural glass synthesizing burners having inner burners and an outer burners for generating oxyhydrogen flame; synthesizing fluorine-containing glass particles α by supplying Gas A containing silicon and Gas B containing fluorine to the inner burners to form an inner deposition region by depositing the glass particles α; and synthesizing fluorine-free glass particles β by supplying only Gas A containing silicon to the outer burners to form an outer deposition region by depositing the glass particles α around the inner deposition region.

Since $SiF_4$ is not generated as an adsorbed species in the outer deposition region, the adhesion force between glass particles is maintained strong. Thus, a strong adhesion force is maintained, and it is possible to cover the surface of the porous silica preform with the outer deposition region in which the adhesion force is strong.

In the first embodiment of the method for fabricating a porous silica preform according to the second aspect of the present invention, the step of forming a outer deposition region by depositing the glass particles β around the inner deposition region may include the step of maintaining a temperature of a surface of the inner deposition region to 400° C. or higher.

This ensures that the glass particles β are deposited before the glass particles α are cooled down (while the temperature of the glass particles α is still high).

The first embodiment of the method for fabricating a porous silica preform according to the second aspect of the present invention may further include the step of adjusting a temperature at which the glass particles β are deposited from the outer burners so that a powder density of the outer deposition region is no less than about 0.15 g/cm³ and no more than about 0.8 g/cm³.

This enables formation of outer deposition region which is high powder density; thus, it is possible to further suppress the incidence of soot breakage.

The first embodiment of the method for fabricating a porous silica preform according to the second aspect of the present invention may further include the step of a ratio of a volume of the outer deposition region to a volume of the inner deposition region is no less than about 0.2 and no more than about 1.0.

This enables formation of the outer deposition region having a sufficient thickness; thus, it is possible to further suppress the incidence of soot breakage.

In the first embodiment of the method for fabricating a porous silica preform according to the second aspect of the present invention, a supply of Gas A and a supply of Gas B supplied to the inner burners may be adjusted so that a ratio of the number of fluorine atoms to the number of silicon atoms in the gas supplied to the inner burners satisfies the following Formula (3):

$$\{(\text{number of F atoms})/(\text{number of Si atoms})\} > 0.3 \quad (3)$$

This enables formation of a porous silica preform which is doped with fluorine at a high concentration, which has been difficult with a conventional method.

A second embodiment of a method for fabricating a porous silica preform according to the second aspect of the present invention is a method for fabricating a porous silica preform including the steps of: supplying fuel gas for generating an oxyhydrogen flame to a glass synthesizing burner having a first nozzle and a second nozzle; supplying Gas A containing silicon from the first nozzle; supplying Gas B containing fluorine from the second nozzle; synthesizing glass particles; and depositing the glass particles around a starting rod.

This prevents $SiO_2$ from being exposed to fluorine-containing compound gas (Gas B) at a high temperature in the oxyhydrogen flame after $SiO_2$ is generated; thus, the $SiO_2$ is exposed to the fluorine-containing compound gas (Gas B) at a relatively low temperature.

In the second embodiment of the method for fabricating a porous silica preform according to the second aspect of the present invention, Gas B may be supplied to the second nozzle after Gas B is mixed with an inert gas.

The inert gas lowers the concentration of fluorine while maintaining the value of {(number of F atoms)/(number of Si atoms)}constant, which further prevents $SiO_2$ from being exposed to fluorine-containing compound gas (Gas B) at a high temperature in the oxyhydrogen flame immediately after $SiO_2$ is generated.

A porous silica preform according to a second aspect of the present invention includes a porous silica preform including a surface layer which does not contain fluorine:

Since $SiF_4$ is not generated as an absorbed species in the outer deposition region, the adhesion force between glass particles is maintained strong; and thus, a strong adhesion force is maintained.

DETAILED DESCRIPTION OF THE INVENTION

First Aspect of the Present Invention

A method for fabricating a porous silica preform which implements a first aspect of the present invention will be described with reference to the drawings.

A porous silica preform 1 is made of glass particles, and an optical fiber preform is obtained from the porous silica preform 1 after heating the porous silica preform 1 in an electric furnace for dehydration and then sintering it for vitrification. As used herein, in the porous silica preform 1, a region which is to be a core of the resultant optical fiber preform is referred to as a core region 11 of the porous silica preform, and a region which is to be a cladding of the resultant optical fiber preform is referred to as a cladding region 12 of the porous silica preform.

First Embodiment of the First Aspect

Figure 1:
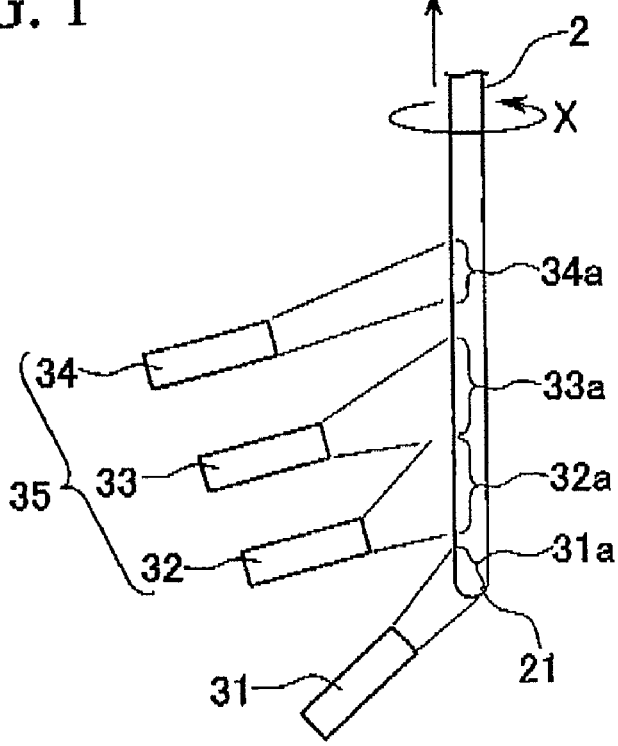
FIG. 1 is a schematic diagram illustrating a fabricating process of a porous silica preform in which glass particles are directly deposited on the starting rod.

FIG. 1 is a schematic diagram illustrating a fabricating process of a porous silica preform in which glass particles are directly deposited on the starting rod. Reference numeral denotes a starting rod 2 is made from silica and the like. The starting rod 2 is rotatably held by a driving mechanism (not shown), and the starting rod 2 is rotated by the shaft in a direction indicated by reference symbol "x" while it is gradually shifted upward.

Around the starting rod 2, glass synthesizing burners, i.e., a core burner 31 and a cladding burner 35 which includes a first cladding burner 32, a second cladding burner 33, and a third burner cladding 34, are disposed.

These burners have a multi-tube structure, and a glass forming gas containing silicon (hereinafter referred to as "Gas A") and fluorine-containing gas ("Gas B") are supplied to a center tube (nozzle). Hydrogen gas as a fuel gas, argon gas as an inert gas, and oxygen gas as a combustion aiding gas are supplied to separate tubes arranged from the center toward the outside.

Gas A is a glass forming gas containing at least silicon-containing compound gas, such as $SiCl_4$. An example of the forming gas is a mixed gas of a silicon-containing compound gas, with another compound gas which contains an element which modifies the refractive index of the porous silica preform 1, such as germanium tetrachloride.

Gas B is a gas containing at least fluorine-containing compound gas. As the fluorine-containing compound gas, $CF_4$, $SiF_4$, $SF_6$, and the like, are preferable since the handling of these gases is easy and fluorine can be easily introduced into silica glass.

The core burner 31 is disposed so that glass particles in deposition area 31a can be deposited on one end of starting rod.

The first cladding burner 32 is disposed so that the glass particles deposition area 32a comprised of cladding region 12 can be deposited upward to 31a. The second cladding burner 33 is disposed so that the glass particles in deposition area 33a comprising of cladding region 12 can be upward to 32a.

Similarly, the third cladding burner 34 is disposed so that the glass particles in deposition area 34a comprising of cladding region 12 can be upward to 33a.

As used herein, "a glass particle deposition area" refers to an area in the starting rod 2 in which glass particles is deposited from the burners.

Figure 2:
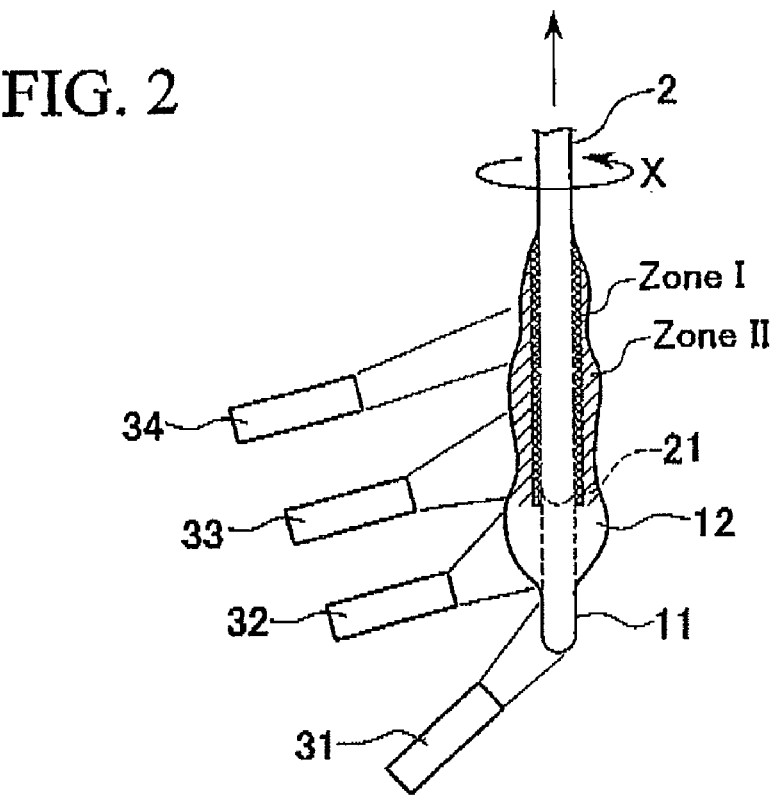
FIG. 2 is a schematic diagram illustrating a fabricating process of a porous silica preform in which glass particles are deposited around the starting rod.

In a first step, the starting rod 2 is rotated about the shaft in a direction indicated by reference symbol "x" while it is gradually shifted upward, and glass particles are directly deposited on the starting rod 2 (i.e., deposited in Zone I in FIG. 2).

Gas A, hydrogen gas, argon gas, and oxygen gas are supplied to the cladding burner 31 without supplying Gas B, and an oxyhydrogen flame is jetted from the nozzle.

In the oxyhydrogen flame jetted from a nozzle of a burner, hydrolysis or oxidation of glass forming material occurs and glass particles made of silicon oxide ($SiO_2$) free of fluorine are synthesized. These glass particles are carried by the flame, and adhere to and are deposited on the starting rod 2.

Gas A, Gas B, hydrogen gas, argon gas, and oxygen gas are supplied to the cladding burner 35, and an oxyhydrogen flame is jetted from the nozzle.

Similar to the core burner 31, in the oxyhydrogen flame, hydrolysis or oxidation of glass forming material and fluorine-containing compound occurs and glass particles made of silicon oxide ($SiO_2$) containing fluorine are synthesized. These glass particles are carried by the flame, and adhere to and are deposited around the starting rod 2.

According to the present invention, when glass particles are deposited in Zone I shown in FIG. 2, a supply of Gas A and a supply of Gas B supplied to each burner are adjusted so that a ratio of the number of fluorine atoms to the number of silicon atoms in the gas supplied to each burner satisfies the following Formula (1):

$$\{(\text{number of F atoms})/(\text{number of Si atoms})\} \leq 0.1 \qquad (1)$$

As used herein, "the number of fluorine atoms in gas supplied to a burner" is defined as a product of the flow rate (supply quantity (mols) per unit time) of the supplied fluorine-containing compound gas and the number of fluorine atoms in one molecule of the fluorine-containing compound gas. Similarly, "the number of silicon atoms in gas supplied to a burner" is defined as a product of the flow rate (supply quantity (mols) per unit time) of the supplied silicon-containing compound gas and the number of silicon atoms in one molecule of the silicon-containing compound gas.

In a burner to which the fluorine-containing compound gas is not supplied, as in case of the core burner 31, the above-mentioned Formula (1) is satisfied since the number of fluorine atoms is zero.

Next, in a second step, in order to fabricate a porous silica preform containing fluorine at a desired concentration, glass particles are further deposited on the glass particles which have been deposited in the first step, by adjusting a supply of Gas A and a supply of Gas B so that a ratio of the number of fluorine atoms to the number of silicon atoms in the gas supplied to a burner is maintained to a desired value.

As shown in FIG. 2, when the starting rod 2 is moved upward gradually while rotating the starting rod 2 about the shaft in a direction indicated by reference symbol "x", glass particles from the core burner 31 deposit in one end 21 of the starting rod 2 (a bottom end in the vertical direction in FIG. 1). The deposited porous silica preform grows, extending longitudinally downward; thus, the core region 11 is formed.

The resultant core region 11 moves upward with the starting rod 2, and as the formed core region 11 enters the deposition area 32a of the first cladding burner 32, glass particles discharged from the first cladding burner 32 deposit on the surface of core region 11. As the resultant porous silica preform moves further upward, and when it enters the deposition area 33a of the second cladding burner 33, glass particles discharged from the second cladding burner 33 deposit on the porous silica preform being fabricated. As the resultant porous silica preform moves further upward, and when it enters the deposition area 34a of the third cladding burner 34, glass particles discharged from the third cladding burner 34 deposit on the porous silica preform being fabricated.

Figure 3:
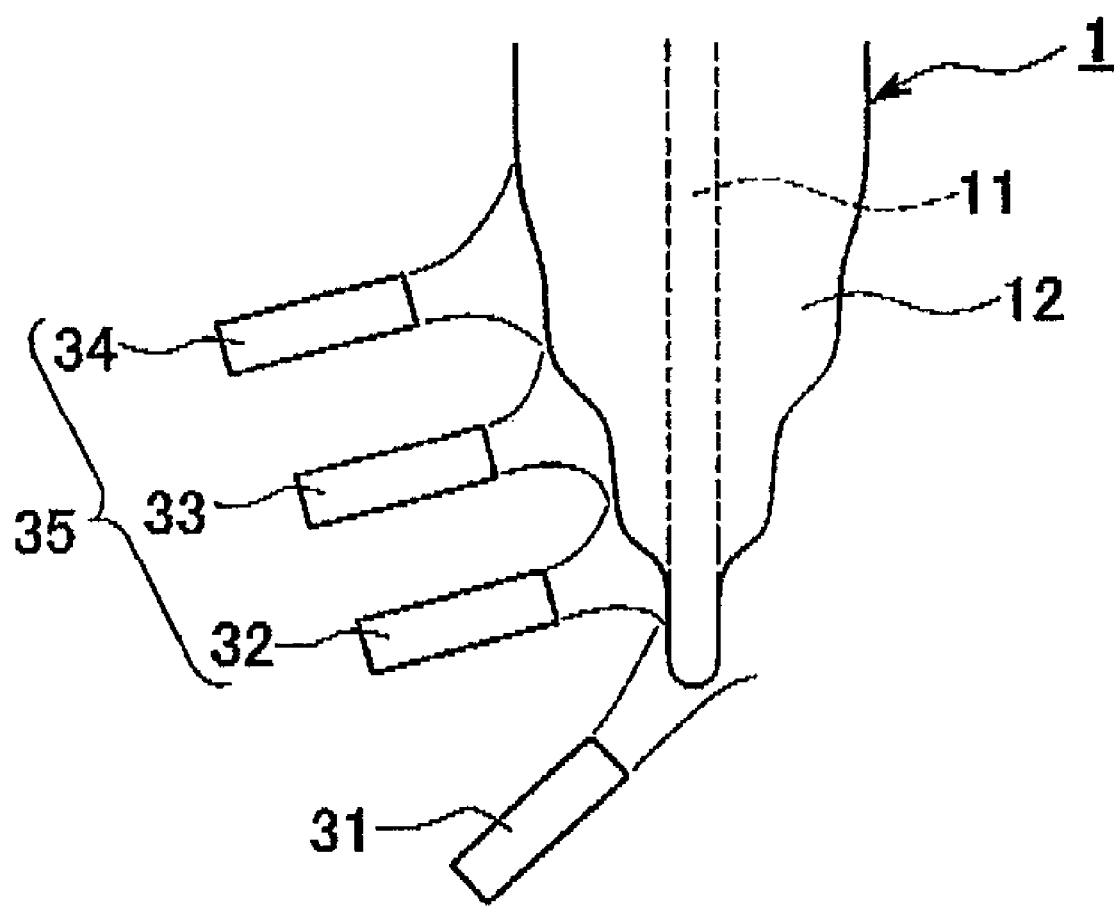
FIG. 3 is a schematic diagram illustrating a fabricating process of a porous silica preform in which a porous silica preform is being formed.

In this manner, glass particles from the first cladding burner 32, the second cladding burner 33 and the third cladding burner 34 deposit on the surface of core region 11 sequentially, and the cladding region 12 is formed. As a result, the porous silica preform 1 is formed as shown in FIG. 3.

The present inventor studied the falling off of the porous silica preform 1 from the starting rod 2, it was found that the falling off from the starting rod 2 of the porous silica preform 1 starts from a portion of the porous silica preform 1 located in proximity to the starting rod 2, particularly, from the portion of a porous silica preform 1 which is in contact with the starting rod 2.

It is known that $SiF_4$ is generated by an etching reaction and the adhesion force between glass particles is reduced when a large amount of fluorine-containing compound gas is supplied (at a high concentration). It is considered that adhesion force of glass particles to the starting rod 2 is weakened if this etching reaction occurs.

Based on the above-mentioned findings, the present inventor had studied the relationship between the ratio of the number of fluorine atoms to the number of silicon atoms in the gas supplied to a burner in the first step and an incidence of falling off of the porous silica preform 1, and conceived the present invention.

Figure 4:
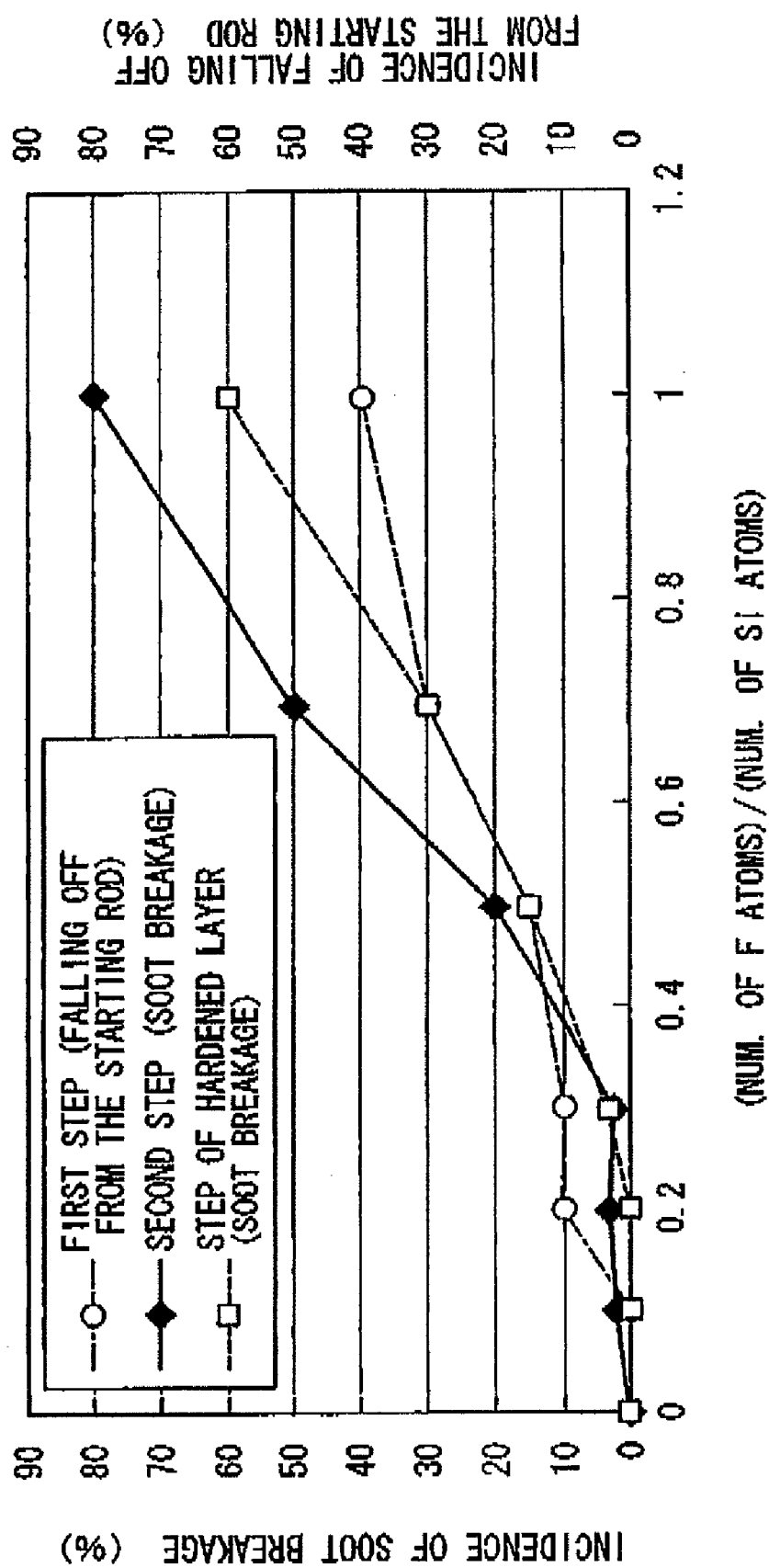
FIG. 4 is a graph indicating the relationship between a ratio of the number of fluorine atoms to the number of silicon atoms in the gas supplied to a burner and an incidence of soot breakage in the resulting porous silica preforms and an incidence of falling off from the starting rod.

According to this embodiment, as shown in FIG. 4, the incidence of falling off of the porous silica preform 1 is reduced by adjusting the supply of Gas A and the supply of Gas B which are supplied in the first step to reduce the supply of the fluorine-containing compound gas so that a ratio of the number of fluorine atoms to the number of silicon atoms in the gas supplied to each burner satisfies Formula (1) described above.

It is possible to suppress the etching reaction to ensure that glass particles are strongly adhered to the starting rod 2 by reducing the supply of fluorine-containing compound gas supplied to reduce the fluorine content of the glass particles deposited in Zone I so that Formula (I) is satisfied.

Glass particles deposited in the first step forms a boundary between the porous silica preform 1 and the starting rod 2, and since glass particles are strongly adhered to the starting rod 2 in the boundary, the porous silica preform 1 can support its own weight. Accordingly, the incidence of falling off of the porous silica preform 1 is reduced, as shown in FIG. 4.

The thickness of glass particles deposited directly on the starting rod 2, i.e., the thickness of Zone I, in the first step is about 0.5 mm to about 50 mm, preferably no less than 0.5 mm and no more than 50 mm, and more preferably is no less than 5 mm and no more than 30 mm. Hereinafter, this region is defined as Zone I as shown in FIG. 2.

When the glass particles are deposited to the thickness of the above described range, the porous silica preform 1 can support its own weight. Accordingly, falling off of the porous silica preform 1 is significantly reduced.

The technical scope of the present invention is not limited to the above-described embodiments; various changes can be made without departing from the spirit of the present invention.

For example, in a method for depositing glass particles around the starting rod 2, any technique which enables deposition of glass particles around the starting rod 2 to form the porous silica preform 1 may be used. A Modified Chemical Vapor Deposition method (MCVD) or an Outside Vapor Deposition method (OVD) may be used, for example.

The core region 11 may be formed by supplying Gas B to the core burner 31 and depositing fluorine-containing glass particles while adjusting a supply of Gas A and a supply of Gas B so that a ratio of the number of fluorine atoms to the number of silicon atoms in the gas supplied satisfies the Formula (1) described above. In addition, the supply of Gas A and the supply of Gas B supplied to the respective burners 32, 33 and 34 of the cladding burner 35 may be varied so that the ratio of the number of fluorine atoms to the number of silicon atoms is varied for each burner.

Second Embodiment of the First Aspect

The second embodiment differs from the first embodiment in that in the first and second steps, when glass particles are deposited at least in Zone II shown in FIG. 2 while adjusting the supply of Gas A and the supply of Gas B so that a ratio of the number of fluorine atoms to the number of silicon atoms in the gas supplied to a burner satisfies the following Formula (2):

$${(number\ of\ F\ atoms)/(number\ of\ Si\ atoms)} \leq 0.3 \qquad (2)$$

The present inventor studied breakage (soot breakage) and cracking of a porous silica preform 1, and it was found that these soot breakage and cracking originate from a portion of the porous silica preform 1 located in proximity to the starting rod 2.

As shown in FIGS. 1 and 2, it is considered that soot breakage and cracking occur for the following reasons when glass particles are deposited around the starting rod 2 using plurality glass synthesizing burners.

There is a difference in temperature between the center and the periphery of the oxyhydrogen flame from a burner. Glass particles synthesized in the periphery of the flame at a low temperature have a low powder density and are soft, and these glass particles at low temperatures deposit around the starting rod 2.

As the starting rod 2 moves upward, when glass particles having a low powder density enter a deposition area of a burner disposed upward with respect to the region in which the glass particles have been deposited, the glass particles are sintered by the oxyhydrogen flame from the burner and shrink. It is considered that at that time the glass particles are subjected to stress and are distorted, and soot breakage and cracking occur.

According to this embodiment when glass particles are deposited at least Zone II shown in FIG. 2, it is possible to suppress the etching reaction by adjusting the supply of Gas A and the supply of Gas B so that a ratio of the number of fluorine atoms to the number of silicon atoms in the gas supplied to each burner satisfies the Formula (2) mentioned above. As a result, the adhesion force between glass panicles can be maintained strong.

By adjusting the gas supplied to each burner in this manner, even if the glass particles with a low powder density are subjected to stress while they are sintered, incidence of soot breakage and cracking can be suppressed by a strong adhesion force between glass particles. Therefore, incidence of soot breakage of the porous silica preform 1 can be reduced, as shown in FIG. 4.

As used herein, the phrase "depositing glass particles at least in proximity to the starting rod 2" means that the glass particles are deposited starting from the boundary between the porous silica preform 1 and the surface of the starting rod 2 toward the radial direction of the starting rod 2, and in the example shown in FIG. 2, it means that the glass particles are deposited at locations upward with respect to the lower end (reference numeral 21 in FIG. 2) of the starting rod 2 shown as Zone II.

In the second step, as long as glass particles are deposited at least in Zone II shown in FIG. 2 by adjusting the supply of Gas A and the supply of Gas B so that the ratio of the number of fluorine atoms to the number of silicon atoms in the gas supplied to each burner satisfies the Formula (2) described above. In areas other than Zone II, glass particles may be deposited by adjusting the supply of Gas A and the supply of Gas B so that the ratio of the number of fluorine atoms to the number of silicon atoms in the gas supplied to a burner is greater than 0.3.

Zone II shown in FIG. 2 are the boundary between the starting rod 2 and the porous silica preform 1. Such an area defines a defective region (varying region) of the porous silica preform 1. Glass particles which are deposited bellow Zone II shown in FIG. 2 defines an effective region (steady region) of the porous silica preform 1. Therefore, the fluorine content in the steady region of the porous silica preform 1 can be increased, and porous silica preform 1 which is doped with fluorine at a high concentration can be fabricated with less soot breakage and cracking.

Third Embodiment of the First Embodiment

A third embodiment of the present invention differs from the first embodiment in that a core region and a cladding region are formed with any supplies of Gas A and Gas B with no attention to the ratio of the number of fluorine atoms to the number of silicon atoms in the gas supplied does not satisfy previously described Formula (1) or (2). Furthermore, the third embodiment differs from the first embodiment in that after the formation of a porous silica preform 10 (FIGS. 5 and 6) is completed, the temperature of the flame of the burner is increased to form a hardened layer 13 which is to be a tail (tip) of the porous silica preform 10.

Explanation of the method for synthesizing in the oxyhydrogen flame from a burner and depositing glass particles to the starting rod 2 to form the core region 11 and the classing region 12 is omitted because it is the same as that used in the first embodiment.

Figure 5:
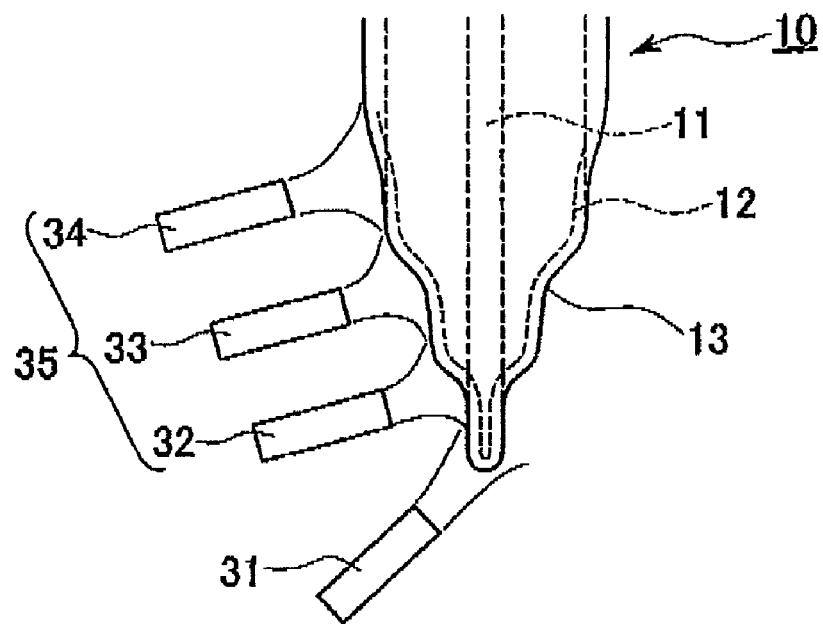
FIG. 5 is a schematic diagram illustrating an example of a fabricating process of a porous silica preform in which oxyhydrogen flames from burners are discharged to a region which is to be a tail of the porous silica preform.
Figure 6:
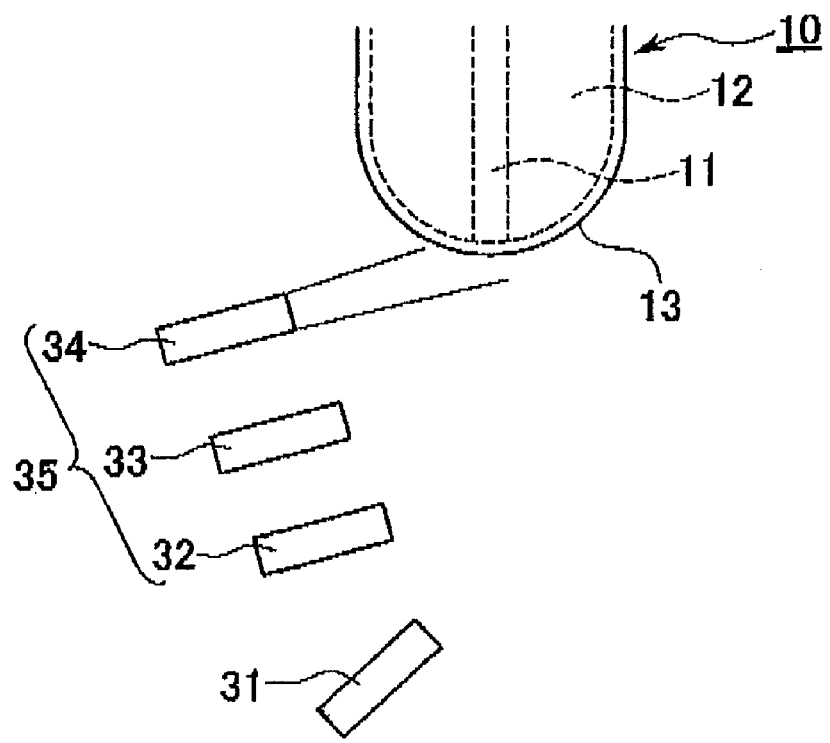
FIG. 6 is a schematic diagram illustrating an example of a fabricating process of a porous silica preform in which supply of gas to each burner is stopped sequentially.

FIG. 5 is a schematic diagram illustrating an example of a fabricating process of a porous silica preform. The region of a tail of the porous silica preform 10 is heated by oxyhydrogen from a burner.

After glass particles are deposited to form a core region 11 and a cladding region 12, a supply of Gas A and a supply of Gas B are adjusted so that a ratio of the number of fluorine atoms to the number of silicon atoms in the gas supplied to each burner satisfies the following Formula (2). Furthermore, the temperature of the oxyhydrogen flame is increased by adjusting supply of hydrogen gas, oxygen gas, and argon gas so that the temperature of the surface of the deposited silica glass particles is no less than about 600° C. and no more than about 1300° C., and preferably no less than 600° C. and no more than 1300° C. More preferably, the temperature of the surface of the deposited silica glass particles is no less than 700° C. and no more than 1200° C.

$$\{(\text{number of F atoms})/(\text{number of Si atoms})\} \leq 0.3 \quad (2)$$

Glass particles are deposited on the surface of a region 13 which is to be a tail of the porous silica preform 10 while maintaining the supply of Gas A and the supply of Gas B and the temperature of the oxyhydrogen flame. At the same time, the glass particles in the region which is to be a tail are sintered by the heat of the oxyhydrogen flame in order to increase the powder density.

After following the procedures described above, the hardened layer 13 which has a high powder density and in which a ratio of the number of fluorine atoms to the number of silicon atoms satisfies the Formula (2) mentioned above has been formed on the surface of the region which is to be a tail of the porous silica preform 10.

After the hardened layer 13 having a predetermined thickness is formed, supply of all of the gas are stopped for all of the burners, and the glass particles are cooled down to obtain the porous silica preform 10.

Because the ratio of the number of fluorine atoms to the number of silicon atoms is small in the hardened layer 13, the etching reaction is suppressed, and the adhesion force between glass particles is maintained strong. Furthermore, since the glass particles are sintered in the oxyhydrogen flame, the powder density and the hardness of the glass particles are increased.

Since the inner portion of the porous silica preform 10 is protected by the hardened layer 13, it is possible to suppress incidence of soot breakage and cracking at the tail of the porous silica preform 10 while the porous silica preform 10 is cooled down after it is fabricated.

When adjusting the supply of Gas A and the supply of Gas B so that a ratio of the number of fluorine atoms to the number of silicon atoms in the gas supplied to each burner satisfies the Formula (2) mentioned above, it is preferable to change the supply of Gas A and the supply of Gas B gradually.

When the hardened layer 13 is formed, glass particles are heated by the high-temperature oxyhydrogen flame and shrink. How much the glass particles shrink is dependent on the powder density of glass particles. Therefore, when the powder density of the deposited glass particles changes regionally, such regions are subjected to stress during the formation of the hardened layer 13 due to difference in shrinkage of glass particles, and soot breakage occurs.

When the supply of Gas A and the supply of Gas B change rapidly, the fluorine content of the deposited glass particles varies, causing a change in the powder density. Therefore, when adjusting the supply of Gas A and the supply of Gas B, if the change in the powder density of the deposited glass particles will be slow, a great change of the powder density can be suppressed and stress due to the difference in shrinkage of glass particles is reduced. Therefore, it is possible to further suppress the incidence of soot breakage.

In addition, the supply of Gas A and the supply of Gas B and the temperature of the flame may be varied for all of the burners at one time. Alternatively, the supply of Gas A and the supply of Gas B and the temperature of the flame may be adjusted the core burner, and then the first, second and third cladding burners 31, 32 and 33 sequentially so that the hardened layer 13 may be formed starting from the tail of the porous silica preform 10 to the upper portion.

When the formation of the hardened layer 13 is completed, the supply of the gas may be stopped for all of the burners at one time. Alternatively, the supply of the gas may be stopped starting from the core burner, and then the first, second and third cladding burners 31, 32 and 33 sequentially according to the upward shift of the porous silica preform 10.

The first aspect of present invention will now be described in detail using the examples. However, the present invention is not limited to the particular examples described herein.

Example 1

Around the starting rod 2 made from silica or the like, glass synthesizing burners, i.e., a core burner 31 and a cladding burner 35 which includes a first cladding burner 32, a second cladding burner 33, and a third burner cladding 34, were disposed, as shown in FIG. 1.

$SiCl_4$ gas as a glass forming gas (Gas A), $CF_4$ gas a fluorine-containing compound gas (Gas B), hydrogen gas, argon gas, and oxygen gas were supplied at appropriate amounts (flow rates) to each of the burners in the first step. Glass particles were synthesized by the oxyhydrogen flame from burners, and were deposited directly on the rotating starting rod 2 which were rotated while shifted upward.

In this example, $SiCl_4$ gas and $GeCl_4$ gas were supplied as Gas A to the core burner 31 without supplying Gas B.

Then, in the second step, the supply of the gas supplied to each burner were adjusted to values listed in Table 1. Glass particles were synthesized under these conditions, and were deposited on the glass particles which had been deposited in the first step. A porous silica preform 1 having a diameter of about 220 mm and a length of 1400 mm was fabricated.

TABLE 1

| Supply | First cladding Burner | Second cladding Burner | Third cladding Burner |
| --- | --- | --- | --- |
| $H_2$ (liter/min.) | 24 | 30 | 42 |
| $O_2$ (liter/min.) | 12 | 14 | 20 |
| $SiCl_4$ (liter/min.) | 2.2 | 3.1 | 3.8 |
| Ar (liter/min.) | 2.4 | 3.2 | 6 |
| $CF_4$ (liter/min.) | 0.45 | 0.8 | 0 |
| (Number of F atoms)/ (Number of Si atoms) | 0.82 | 1.03 | 0 |

Example 2

Example 2 differs from Example 1 in that when glass particles were deposited in Zone II in the first and second steps, the supply of the gases supplied to each burner was adjusted to appropriate values, and glass particles were synthesized and were deposited in Zone II shown in FIG. 2 under such conditions.

When glass particles were deposited on a region which is to be the effective region of the porous silica preform in the second step, the supply of the gases supplied to each burner was adjusted to values listed in Table 1. Glass particles were synthesized, adhered and were deposited under these conditions. A porous silica preform 1 having a diameter of about 220 mm and a length of 1400 mm was fabricated.

Example 3

In the first and second steps, the supply of the gases supplied to each burner was adjusted to values listed in Table 1. Glass particles were synthesized, adhered and were deposited under these conditions to form the core region 11 and the cladding region 12.

The supply of the gases supplied to each burner was adjusted to appropriate values, and the temperature of the oxyhydrogen flame was increased. Glass particles were synthesized under these conditions, and glass particles were deposited on the region which is to be a tail of the porous silica preform 1 to form the hardened layer 13. A porous silica preform 1 having a diameter of about 220 mm and a length of 1400 mm was fabricated.

In Examples 1 to 3, several porous silica preforms 1 were fabricated under the same conditions, and soot breakage and falling off from the starting rod were examined. Incidences of soot breakage and falling off were then calculated. The relationship between a ratio of the number of fluorine atoms to the number of silicon atoms in the gas supplied to the burners and incidences of soot breakage and falling off were determined. The results were shown in FIG. 4.

For the porous silica preforms 1 which were fabricated by varying the ratio of the number of fluorine atoms to the number of silicon atoms in the gas supplied to the burners in the first step, incidences of falling off were determined. For the porous silica preforms 1 which were fabricated by varying the ratio of the number of fluorine atoms to the number of silicon atoms in the gas supplied to the burners in the second step, incidences of soot breakage were determined.

For the porous silica preforms 1 which were fabricated by varying the ratio of the number of fluorine atoms to the number of silicon atoms in the gas supplied to the burners in the step of forming the hardened layer, incidences of soot breakage were determined.

As shown in FIG. 4, it was found that the incidence of falling off from the starting rod 2 of the porous silica preform 1 was significantly reduced when glass particles were deposited in Zone I in the first step, when a ratio of the number of fluorine atoms to the number of silicon atoms in the gas supplied to a burner satisfied the Formula (1) described before.

It was also found that the incidence of soot breakage of the porous silica preform 1 can be reduced when glass particles were deposited in Zone II shown in FIG. 2 in the second step, when a ratio of the number of fluorine atoms to the number of silicon atoms in the gas supplied to a burner satisfied the Formula (2) described above.

It was also found that if the hardened layer 13 is formed in a region which is to be a tail of the porous silica preform 1, when a ratio of the number of fluorine atoms to the number of silicon atoms in the gas supplied to a burner satisfied the Formula (2) described above soot breakage of the porous silica preform 1 can be reduced.

Second Aspect of the Present Invention

A method for fabricating a porous silica preform which implements a second aspect of the present invention will be described with reference to the drawings.

As used herein, in the porous silica preform 41, a region which is to be a core of the resultant optical fiber preform is referred to as a core region 51 of the porous silica preform, and a region which is to be a cladding of the resultant optical fiber preform is referred to as a cladding region 52 of the porous silica preform.

First Embodiment of the Second Aspect

Figure 7:
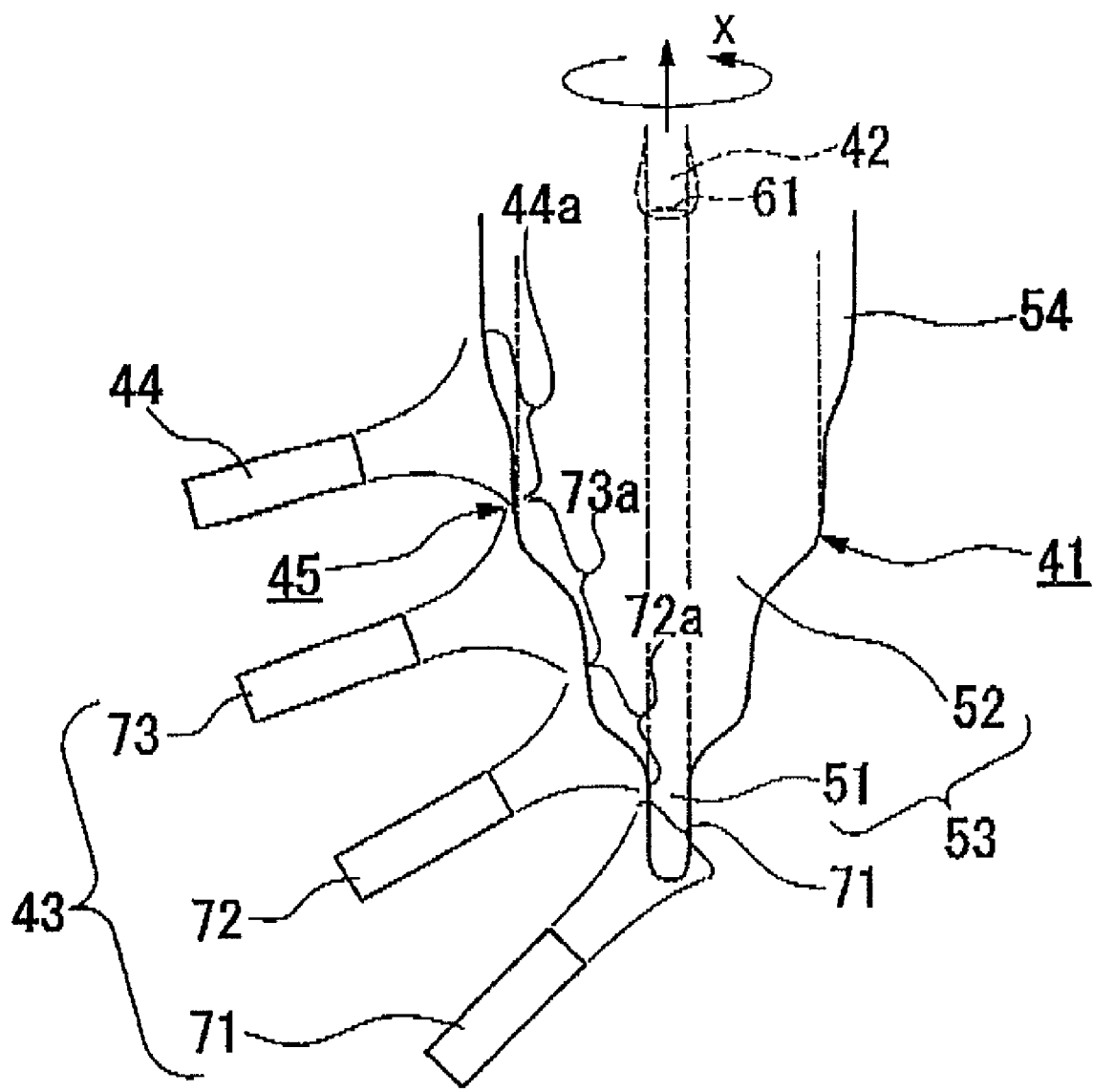
FIG. 7 is a schematic diagram illustrating an example of a fabricating process of a porous silica preform in which glass particles are deposited around the starting rod.

FIG. 7 is a schematic diagram illustrating an example of a fabricating process of a porous silica preform in which glass particles are deposited on a starting rod 42.

Around the starting rod 42, an inner burner 43 and outer burners 44 are disposed as glass synthesizing burners.

Gas A and Gas B are supplied to each center tube of the inner burner 43 and the outer burners 44. Hydrogen gas as a fuel gas, argon gas as an inert gas, and oxygen gas as a combustion aiding gas are supplied to these burners.

The inner burners 43 deposit glass particles which is to be the core region 51 and the cladding region 52 of the porous silica preform 41. The inner burner 43 is configured to be supplied Gas A and Gas B for synthesizing fluorine-containing glass particles (referred to as glass particles a).

When plural burners are used for the inner burner 43, as long as Gas A and Gas B are supplied to one of the plural burners, it is not necessary to supply Gas B to other burners.

In FIG. 7, the inner burner 43 is comprised of a core burner 71, a first cladding burner 72, and a second cladding burner 73. The first and second cladding burners 72 and 73 are configured to be supplied Gas A and Gas B, and to deposit glass particles α to the starting rod 42.

The core burner 71 is configured not to be supplied Gas B so that fluorine-free glass particles (referred to as glass particles β) are synthesized, and to deposit them to the starting rod 42.

The core burner 71 is disposed so that glass particles β which are to form the core region 51 to deposition area 71$a$ on the starting rod 42. The first cladding burner 72 is disposed so that the glass particles α in deposition area 72$a$ can be upward to 71$a$.

The second cladding burner 73 is disposed so that the glass particles α in deposition area 73$a$ can be upward to 72$a$.

A portion of the porous silica preform 41 which is formed from the inner burner 43, i.e., the core region 51 and the cladding region 52, is referred to as the inner deposition region 53.

The outer burner 44 deposit glass particles which is to be a surface layer (outer deposition region 54) of the porous silica preform 41. The outer burner 44 is configured not to be supplied Gas B so that fluorine-free glass particles β are synthesized, and to deposit them on glass particles α.

Next, a method for fabricating a porous silica preform in which glass particles are deposited around the starting rod 42 using the inner burner 43 and the outer burner 44, will be described in detail.

Gas A, Gas B, hydrogen gas, argon gas, and oxygen gas are supplied to the inner burner 43, i.e., the first and second cladding burners 72 and 73, respectively, and the oxyhydrogen flame is jetted from the nozzle.

In the oxyhydrogen flame jetted from a nozzle of a burner, hydrolysis or oxidation of glass forming material occurs and glass particles made of silicon oxide ($SiO_2$) are synthesized. Fluorine-containing compound gas is also supplied to the oxyhydrogen flame, and fluorine is taken into the resultant glass particles to form fluorine-containing glass particles α, which are carried by the flame, adhered to and deposited around the starting rod 42.

Gas A, hydrogen gas, argon gas, and oxygen gas are supplied to the core burner 71 of the inner burner 43 and the outer burner 44 without supplying Gas B, and the oxyhydrogen flame is jetted from the nozzle.

Similar to the inner burner 43, in the oxyhydrogen flame jetted from a nozzle of a burner, hydrolysis or oxidation of glass forming material occurs and glass particles β made of silicon oxide ($SiO_2$) free of fluorine are synthesized. These glass particles β are carried by the flame, and adhere to and are deposited around the starting rod 42.

When starting rod 42 is moved upward gradually while rotating the starting rod 42 about the shaft in a direction indicated by reference symbol "x", glass particles β discharged from the core burner 71 deposit at one end 61 of the starting rod 2 (a bottom end in the vertical direction in FIG. 7). The deposited porous silica preform grows, extending longitudinally downward; thus, the core region 51 is formed.

The resultant core region 51 moves upward with the starting rod 42, and as the resultant core region 51 enters the deposition area 72$a$ of the first cladding burner 72, glass particles α discharged from the first cladding burner 72 deposit on the surface of core region 51. As the resultant porous silica preform moves further upward, when it enters the deposition area 73$a$ of the second cladding burner 73 glass particles α discharged from the second cladding burner 73 deposit on the porous silica preform.

In this manner, glass particles α discharged from the first cladding burner 72 and the second cladding burner 73 deposit on the surface of core region 51 sequentially; thus, the cladding region 52 is formed. As a result, the inner deposition region 53 (the core region 51 and the cladding region 52) made of at least glass particles α is formed.

Next, the resultant core region 51 and cladding region 52 move further upward and as they enter the deposition area 44$a$ of the outer burner 44, glass particles β discharged from the outer burner 44 deposit on the surface of cladding region 52; thus, the outer region 54 is formed on the surface of the cladding region 52.

Since the outer burner 44 is not supplied with fluorine-containing compound gas, the outer deposition region 54 made of fluorine-free glass particles β is formed.

According to this embodiment of the present invention, the outer deposition region 54 is formed by depositing fluorine-free glass particles β on the surface of fluorine-containing glass particles α, i.e., the cladding region 52, which have been deposited around the starting rod 42. Therefore, since $SiF_4$ is not generated at the outer deposition region 54, the adhesion force between glass particles β is not weakened; thus a sufficient adhesion force is maintained. Since the adhesion force in the deposition region 54 is strong, soot breakage does not occur in the deposition region 54 even if the temperature of the deposition region 54 decreases and the deposition region 54 shrinks. Therefore, soot breakage on the surface of porous silica preform 41 can be prevented.

Particularly in this embodiment, the inner burner 43 and the outer burner 44 are arranged at the direction of shift of the starting rod 42, i.e., longitudinally, and while the starting rod 42 is moved, and glass particles α are deposited for forming the inner deposition region (the core region 51 and the cladding region 52) using the inner burner 43. At the same time, fluorine-free glass particles β are deposited for forming the outer deposition region 54 using the outer burner 44. Thus, glass particles can be deposited on the glass particles a immediately after glass particles α are deposited.

Soot breakage tends to occur while the temperature of glass particles decreases and the glass particles shrink. However, in this embodiment, glass particles β can be deposited on the glass particles α immediately after glass particles α are deposited, as described above. Accordingly, glass particles β can be deposited before glass particles α are cooled off (while the glass particles α are still sufficiently hot).

Therefore, because glass particles α do not cool off or shrink before the outer deposition region 54 is formed, breakage on the surface of the fluorine-containing cladding region 52 which are not firmly adhered together can be prevented. Thus, soot breakage originating from the breakage on the surface of cladding region 52 while porous silica preform 41 is cooled off after completion of fabrication thereof can be prevented.

In particular, it is preferable to deposit glass particles β on glass particles α to form the outer deposition region 54 while maintaining the temperature of the glass particles α at 400° C. or higher. This further prevents breakage on the surface of the cladding region 52 resulting from the shrinkage of the cladding region 52 when it is cooled off; thus breakage of porous silica preform 41 can be almost completely eliminated.

For example, narrowing the distance between the deposition area of the inner burner 43 (deposition area 73a of the second cladding burner 73 which is the uppermost burner of the inner burner 43 in this embodiment) and the deposition area 44a of the outer burner 44, the time difference from when glass particles α are deposited from the inner burner 43 to when glass particles β are depositing from the outer burner 44 can be reduced. Accordingly, a decrease in the temperature of glass particles α after deposition can be reduced, and the temperature of the glass particles α can be maintained at about 400° C. or higher, preferably 400° C. or higher.

It is preferable to adjust the temperature at which glass particles β are deposited from the outer burner 44 by adjusting the respective supply of hydrogen gas, argon gas and oxygen gas so that the powder density of the deposition area 44a is no less than about 0.15 g/cm³ and no more than about 0.8 g/cm³, preferably no less than 0.15 g/cm³ and no more than 0.8 g/cm³.

This ensures formation of a dense and solid outer deposition region 54, which further prevents soot breakage.

The powder density of the outer deposition region 54 of lower than about 0.15 g/cm³ is undesirable since the outer deposition region 54 becomes fragile and is more susceptible to soot breakage. Furthermore, the powder density of the outer deposition region 54 of higher than about 0.8 g/cm³ is undesirable. This is because the outer deposition region 54 becomes too dense and the dehydration treatment tends to insufficient; thus, an optical fiber with a low transmission loss is hard to obtain.

It is preferable to deposit glass particles β to form the outer deposition region 54 by adjusting the flow rate of Gas A and supply time of Gas A to the outer burner 44 in order to adjust the supply of the glass forming gas so that the ratio of the volume of the outer deposition region 54 to the volume of fluorine-containing glass particles α in the inner deposition region 53 is not less than about 0.2 and no more than about 1.0, preferably not less than 0.2 and no more than 1.0.

This ensures the formation of the outer deposition region 54 having a sufficient thickness; thus, it is possible to further suppress soot breakage.

The volumes of glass particles α and the outer deposition region 54 can be calculated from the diameter of the porous silica preform 41.

For example, during the fabrication of the porous silica preform 41, the diameter of the porous silica preform 41 at upper ends of each of the deposition areas 71a, 72a, 73a, and 44a shown in FIG. 7 (the upper ends of periphery regions in the vertical direction) can be measured.

The volume of glass particles α can be calculated from the difference in diameter of the porous silica preform 41 between at the upper end of deposition area 73a and at the upper end of deposition area 71a. Furthermore, the volume of the outer deposition region 54 can be calculated from the difference in diameter of the porous silica preform 41 between at the upper end of the deposition area 44a and the upper end of the deposition area 73a.

The ratio of the volume of the outer deposition region 54 to the volume of fluorine-containing glass particles α of less than 0.2 is not desirable since the outer deposition region 54 becomes thin and soot breakage cannot be sufficiently prevented.

Because the porous silica preform 41 is generally used as an optical fiber preform after dehydration and vitrification, it is also required that fluorine be uniformly distributed throughout the porous silica preform 41.

However, if the ratio of the volume of the outer deposition region 54 to the volume of fluorine-containing glass particles α is greater than 1.0, the outer deposition region 54 becomes too thick and fluorine in glass particles α cannot be distributed throughout the outer deposition region 54 during dehydration and vitrification treatments. Thus, the ratio in this range is not desirable since it is difficult to obtain an optical fiber preform in which fluorine is uniformly distributed.

As described above, since the fluorine-free outer deposition region 54 is formed so that soot breakage can be prevented in this embodiment, soot breakage can be reduced regardless of the quantity of doped fluorine in the inner deposition region 53 (the core region 51 and the cladding region 52).

For example, in a conventional technique it was difficult to fabricate a porous silica preform when a ratio of the number of fluorine atoms to the number of silicon atoms in the gas supplied satisfies the following Formula (3) since soot breakage occurs frequently due to the fluorine-containing compound high concentration. Therefore, in order to fabricate an optical fiber preform which contains fluorine at a high concentration, a porous silica preform in which the concentration of fluorine-containing compound gas is low is fabricated by first depositing glass particles at a low concentration of fluorine-containing compound gas, and then the porous silica preform is sintered in a fluorine-containing compound gas atmosphere to dope further fluorine.

$$\{(\text{number of F atoms})/(\text{number of Si atoms})\} > 0.3 \quad (3)$$

In contrast with a conventional technique, according to this embodiment, a porous silica preform 41 which contains fluorine at a high concentration with less soot breakage can be fabricated and a fluorine containing compound gas for sintering is not needed.

Therefore, it is preferable to adjust the supply of the glass forming gas and fluorine-containing compound gas so that the ratio of the number of fluorine atoms to the number of silicon atoms in the gas supplied to the inner burner 43 satisfies the Formula (3) described above.

If plural burners are used for the inner burner 43, the ratio described in Formula (3) is calculated on each burner.

Next, the porous silica preform 41 according to the second aspect of the present invention will be described.

The porous silica preform 41 according to the second aspect of the present invention includes a surface layer, i.e., the outer deposition region 54 which contains silicon oxide and does not contain fluorine. The porous silica preform 41 is fabricated by the above-described fabrication method according to the second aspect of the present invention.

According to the present invention, the fluorine-free surface layer (the outer deposition region 54) ensures sufficient adhesion between glass particles, as explained above, since $SiF_4$, as an adsorbed species, is not generated in the outer deposition region 54. Since the adhesion force between glass particles is strong in such a surface layer, soot breakage does not occur even when the surface layer is cooled off and thermal contraction occurs. Therefore, soot breakage on the surface of porous silica preform 41 can be prevented.

In addition, when fabricating an optical fiber preform from the obtained porous silica preform 41, the breakage due to impact or the like, can be suppressed. The handling of the porous silica preform 41 is easy. The breakage due to damage during transportation and the like is reduced and the yield can be improved.

After dehydrating and sintering this porous silica preform 41, an optical fiber preform is obtained.

Especially when an optical fiber preform is made including the inner deposited glass particles that contains fluorine at a high concentration so that the Formula (3) is satisfied, the incidence of soot breakage can be significantly reduce by the present invention. This is because an optical fiber preform which is highly resistant to impact can be provided by the present invention, regardless of the fluorine concentration in the inner deposited glass particles. The powder density of the surface layer is preferably no less than about 0.15 $g/cm^3$ and no more than about 0.8 $g/cm^3$, more preferably no less than 0.15 $g/cm^3$ and no more than 0.8 $g/cm^3$, since a dense and solid outer deposition region 54 can further suppress incidence of soot breakage. Furthermore, when fabricating an optical fiber preform, dehydration can be carried out sufficiently, and an optical fiber preform from which become fibers with low transmission loss can be obtained.

Furthermore, the ratio of the volume of the surface layer to the volume of the fluorine-containing portions (fluorine-containing glass particles α) in the core region 51 and the cladding region 52 is preferably no less than about 0.2 and no more than about 1.0, more preferably no less than 0.2 and no more than 1.0. The outer deposition region having a sufficient thickness can further suppress the incidence of breakage with this range. Furthermore, with this range, the fluorine within the core region 51 and the cladding region 52 can diffuse throughout the outer deposition region 54 during the vitrification after dehydration, an uniform distribution of fluorine can be obtained.

The technical scope of the present invention is not limited to the above-described embodiments; rather various changes can be made without departing from the spirit of the present invention.

For example, as a method for depositing glass particles around the starting rod 42, any technique which enables deposition of fluorine-containing glass particles α around the starting rod 42 to form the inner deposition region 53 (the core region 51 and the cladding region 52) while depositing fluorine-free glass particles β on the cladding region 52 immediately to form the outer deposition region 54 may be used. An Outside Vapor Deposition method (OVD) may be used, for example.

Gas B may be supplied to the core burner 71 to deposit fluorine-containing glass particles α to form the core region 51.

Second Embodiment of the Second Aspect

The second embodiment differs from the first embodiment in that two nozzles are provided at the center of the inner burner 43, and Gas A and Gas B are provided to the respective nozzles, rather than Gasses A and B being provided to a single nozzle.

Since other configurations are similar to the first embodiment, detailed description will be omitted.

When Gas A and Gas B are supplied to the same nozzle, $SiO_2$ is exposed to fluorine-containing compound gas (Gas B) at a high temperature in the oxyhydrogen flame immediately after $SiO_2$ is generated.

The etching reaction due to fluorine ($SiO_2$ (s)+4F (g)⇒ $SiF_4$ (ad)+$O_2$ (g), where "s", "g", and "ad" stand for solid, gas, and adsorbed species, respectively) occurs more easily when the temperature is higher and concentration of fluorine is higher. Therefore, if Gas A and Gas B are supplied to the same nozzle, a large amount of $SiF_4$ is generated and the adhesion force between glass particles is significantly weak.

In this embodiment, the silicon-containing compound gas and the fluorine-containing compound gas are supplied separately to respective nozzles to synthesize fluorine-containing glass particles α in the oxyhydrogen flame and deposit them to the starting rod 42.

Accordingly, $SiO_2$ is exposed to fluorine-containing compound gas (Gas B) at a relatively low temperature in the oxyhydrogen flame after $SiO_2$ is generated in the flame. Thus, the etching reaction can be suppressed, and glass particles having a strong adhesion force can be generated and deposited around the starting rod 42 since the adhesion force between glass particles is maintained strong.

Thus, breakage (soot breakage) of the porous silica preform 41 can be suppressed.

In addition, it is preferable to supply the fluorine-containing compound gas to the nozzle after mixed with an inert gas. The inert gas lowers the fluorine concentration while maintaining the value of {(number of F atoms)/(number of Si atoms)} constant. And the generated $SiO_2$ is not exposed to fluorine-containing compound gas (Gas B) at a high temperature in the oxyhydrogen flame immediately after $SiO_2$ is generated.

Therefore, the etching reaction is suppressed, and glass particles α having a strong adhesion force can be generated.

In this embodiment, it is preferable to form the outer deposition region 54 in a manner similar to a first embodiment. This prevents the etching reaction of glass particles α in the inner deposition region 53, and a strong adhesion force is maintained. In addition, the surface can be coated with the outer deposition region 54, which further suppresses the incidence of soot breakage of the porous silica preform 41.

The second aspect of the present invention will now be described in detail using the examples. It should be understood, however, that the present invention is not limited to the particular examples described herein.

Example 4

As shown in FIG. 7, an inner burner 43 and outer burner 44 were provided as multi-tube glass synthesizing burners disposed around the starting rod 42. The inner burner 43 is composed of a core burner 71, a first cladding burner 72, and a second cladding burner 73.

As listed in Table 2, $SiCl_4$ gas as glass forming gas, $CF_4$ as a fluorine-containing compound gas, hydrogen gas, argon gas, and oxygen gas were supplied to each of the burners, and oxyhydrogen flame were jetted from the nozzles.

However, $SiCl_4$ gas and $GeCl_4$ gas were supplied as Gas A to the core burner 71 without supplying Gas B. Since the gas supplied to the first and second cladding burners contains fluorine at a sufficient concentration, the porous silica preform with desired optical characteristics can be obtained.

TABLE 2

|  |  | Example 4 | Example 5 |
|---|---|---|---|
| First cladding Burner (liter/min.) | $H_2$ | 24 | 24 |
|  | $O_2$ | 12 | 12 |
|  | $SiCl_4$ | 2.2 | 2.2 |
|  | Ar | 2.4 | 2.4 |
|  | $CF_4$ | 0.45 | 0.38 |
|  | (Number of F atoms)/(Number of Si atoms) | 0.82 | 0.69 |
| Second cladding Burner (liter/min.) | $H_2$ | 30 | 30 |
|  | $O_2$ | 14 | 14 |
|  | $SiCl_4$ | 3.1 | 3.1 |
|  | Ar | 3.2 | 3.2 |
|  | $CF_4$ | 0.8 | 0.68 |
|  | (Number of F atoms)/(Number of Si atoms) | 1.03 | 0.88 |
| Outer Burner or Third cladding Burner (liter/min.) | $H_2$ | 42 | 42 |
|  | $O_2$ | 20 | 20 |
|  | $SiCl_4$ | 3.8 | 3.8 |
|  | Ar | 6 | 6 |
|  | $CF_4$ | 0 | 0.3 |
|  | (Number of F atoms)/(Number of Si atoms) | 0 | 0.32 |

A multi-tube glass synthesizing burner, i.e., a burner having a multi-tube structure in which a plurality of nozzles are provided, were used. Gas A ($SiCl_4$ gas) and Gas B ($CF_4$ gas) were jetted from respective nozzles using such a burner. Furthermore, $SiCl_4$ gas was mixed with argon.

Glass particles were generated in the oxyhydrogen flame, and the resultant glass particles were adhered and deposited to the starting rod 42 while the starting rod 42 was moved upward. A porous silica preform 41 having a diameter of about 220 mm and a length of 1400 mm was fabricated.

Example 5

The porous silica preform 41 was fabricated so that the desired optical characteristics can be obtained in the effective region in the same manner as Example 4 except that a third cladding burner was provided in the inner burner 43 in place of the outer burner 44, and fluorine-containing glass particles α, were deposited by supplying $CF_4$ gas to each burner at the quantities listed in Table 2, and that the outer deposition region 54 was not formed.

Example 6

The porous silica preform 41 was fabricated so that the desired optical characteristics can be obtained in the effective region in the same manner as Example 4 except that glass particles were jetted using the second cladding burner 73 and the outer burner 44 which were arranged so that the distance between the deposition area 73a of the second cladding burner 73 and the deposition area 44a, of the outer burner 44 became two times longer than the distance between the deposition area 73a of the second cladding burner 73 and the deposition area 44a of the outer burner 44 in Example 4.

Example 7

The porous silica preform 41 was fabricated so that the desired optical characteristics can be obtained in the effective region in the same manner as Example 4 except that the supply of each gas including $SiCl_4$ to the outer burner 44 was adjusted so that the ratio of the volume of the outer deposition region 54 to the volume of the cladding region 52 of the resulting porous silica preform 41 (the amount of deposited fluorine-doped glass particles α) was 0.18, as listed in Table 3.

TABLE 3

|  |  | Example 7 | Example 8 | Example 9 | Example 10 |
|---|---|---|---|---|---|
| Second or third cladding burner (liter/min.) | $H_2$ | 36 | 51 | 32 | 37 |
|  | $O_2$ | 18 | 24 | 15 | 18 |
|  | $SiCl_4$ | 1.2 | 5.8 | 3 | 3.3 |
|  | Ar | 6 | 6 | 6 | 6 |
|  | $CF_4$ | 0 | 0 | 0 | 0 |

Example 8

The porous silica preform 41 was fabricated so that the desired optical characteristics can be obtained in the effective region in the same manner as Example 4 except that the supply of each gas including $SiCl_4$ to the outer burner 44 was adjusted so that the ratio of the volume of the outer deposition region 54 to the volume of the cladding region 52 of the resulting porous silica preform 41 (the amount of deposited fluorine-doped glass particles α) was 1.08, as listed in Table 3.

Example 9

The porous silica preform 41 was fabricated so that the desired optical characteristics can be obtained in the effective region in the same manner as Example 4 except that the supply of each gas including $SiCl_4$ to the outer burner 44 was adjusted so that the powder density of the outer deposition region 54 was 0.12 g/cm$^3$, as listed in Table 3.

Example 10

The porous silica preform 41 was fabricated so that the desired optical characteristics can be obtained in the effective region in the same manner as Example 4 except that the supply of each gas including $SiCl_4$ to the outer burner 44 was adjusted so that the powder density of the outer deposition region 54 was 0.15 g/cm$^3$, as listed in Table 3.

Example 11

The porous silica preform 41 was fabricated in the same manner so that the desired optical characteristics can be obtained in the effective region as Example 4 except that a mixed gas of $SiCl_4$ gas (Gas A) and $CF_4$ gas (Gas B) was supplied to a single nozzle of the third cladding burner and was jetted therefrom.

Example 12

The porous silica preform 41 was fabricated so that the desired optical characteristics can be obtained in the effective region in the same manner as Example 4 except that a mixed gas of $SiCl_4$ gas and hydrogen gas was supplied to a single nozzle of the third cladding burner.

In Examples 4 to 12, when the porous silica preform 41 was fabricated, the temperatures of the surface of glass particles at the boundary 45 of deposition areas 44a and 73a between the third cladding burner and the second cladding burner 73 were measured (hereinafter, this temperature is referred to as "boundary temperature").

The volume of glass particles α was calculated from the difference in the diameter of the porous silica preform between at the upper end of the deposition area 73a and at the upper end of the deposition area 71a. In addition, the volume of the surface layer (the outer deposition region 54) was calculated nom the difference in the diameter of the porous silica preform between at the upper end of the deposition area 44a and at the upper end of the deposition area 73a. The ratio of the volume of the surface layer (the outer deposition region 54) to the volume of the cladding region 52 (the amount of deposited fluorine-doped glass particles α) of the resultant porous silica preform 41 was calculated.

Furthermore, the resultant porous silica preforms 41 were sintered in an electric furnace for vitrification after it was subjected to a dehydration treatment at 1200° C. to obtain an optical fiber preforms 46. The refractive index profile of the core 91 and the cladding 92 of the optical fiber preforms 46 were measured, and relative refractive index difference (variation in index difference Δn due to doping with fluorine) in the cladding 92 was determined.

The results are listed in Table 4.

In Example 4, the powder density of the outer deposition region 54 is 0.19, and the ratio of volume of the outer deposition region 54 to the volume of the cladding region 52 is 0.74. Therefore, fluorine within the cladding region 52 diffuses to the outer deposition region 54 during dehydration at 1200° C., and the cladding 92 having a uniform refractive index profile can be obtained.

Figure 8:
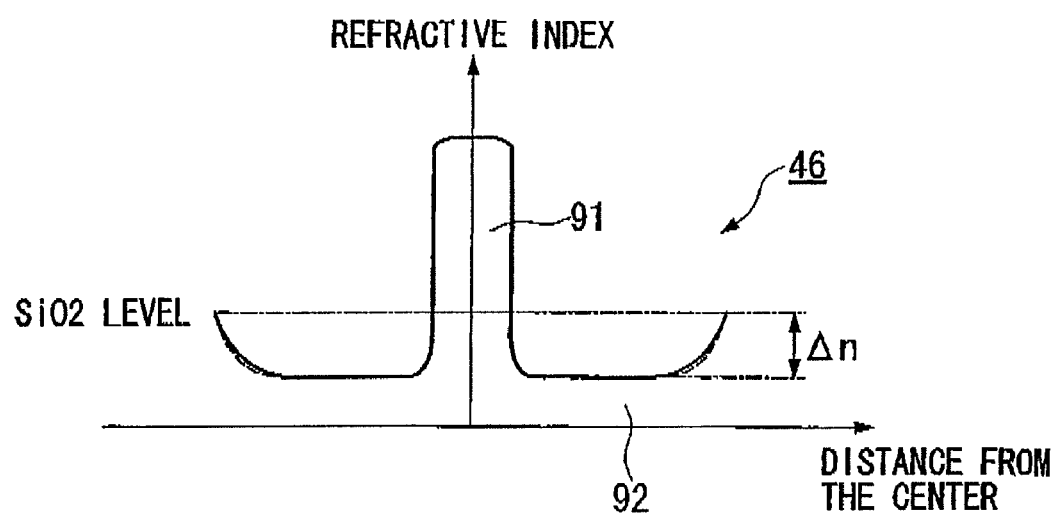
FIG. 8 is a diagram illustrating refractive index profile of an optical fiber preform fabricated using a porous silica preform of Examples 4 and 5.

Therefore, the refractive index profile of the optical fiber preform 46 obtained from the porous silica preform 41 of Example 4 was approximately same as the refractive index profile of the optical fiber preform obtained from the porous silica preform of Example 5 without the outer deposition region 54, as shown in FIG. 8.

In Example 6, it took time for glass particles α which have been deposited from the second cladding burner 73 (the inner burner 43) to reach the deposition area 44a of the outer burner 44 and the deposited glass particles α were cooled off before they reach the deposition area 44a since the deposition area of the inner burner 43 (the deposition area 73a of the second cladding burner 73) and the deposition area 44a of the burner 44 were spaced apart. Therefore, the boundary temperatures was 375° C., which made the porous silica preform susceptible to soot breakage. Soot breakage was observed in one of four porous silica preforms 41 fabricated.

In Example 7, since the ratio of the volume of the outer deposition region 54 to the volume of the cladding region 52 (the amount of deposited fluorine-doped glass particles α)

TABLE 4

| | | Example 4 | Example 5 | Example 6 | Example 7 | Example 8 | Example 9 | Example 10 | Example 11 | Example 12 |
|---|---|---|---|---|---|---|---|---|---|---|
| (Number of F atoms)/ (Number of Si atoms) | first cladding burner | 0.82 | 0.69 | 0.82 | 0.82 | 0.82 | 0.82 | 0.82 | 0.69 | 0.69 |
| | second cladding burner | 1.03 | 0.88 | 1.03 | 1.03 | 1.03 | 1.03 | 1.03 | 0.88 | 0.88 |
| | second burner or third cladding burner | 0 | 0.32 | 0 | 0 | 0 | 0 | 0 | 0.32 | 0.32 |
| boundary temperature (° C.) | | 580 | 560 | 375 | 520 | 620 | 540 | 560 | 560 | 560 |
| Bulk density of surface layer (g/cm$^3$) | | 0.19 | — | 0.19 | 0.22 | 0.17 | 0.12 | 0.15 | — | — |
| Ratio of volume of surface layer to cladding region | | 0.74 | 0.74 | 0.72 | 0.18 | 1.08 | 0.78 | 0.78 | 0.74 | 0.74 |
| Δn | | −0.130 | −0.132 | −0.132 | −0.131 | −0.124 | −0.130 | −0.129 | −0.131 | −0.130 |
| Num of soot breakage/Total num | | 0/12 | 3/6 | 1/4 | 1/3 | 0/4 | 2/5 | 0/6 | 6/6 | 5/6 |

In Example 4, the porous silica preform 41 free from soot breakage was obtained.

In contrast, in Example 5, soot breakage was observed in three of six porous silica preforms 41 fabricated since the outer deposition region 54 was not formed.

Thus, soot breakage can be reduced by depositing glass particles 13 which dose not contain fluorine to form the outer deposition region 54.

Referring to FIG. 8, the refractive index profile of the optical fiber preform 46 obtained from the porous silica preform 41 of Example 4 (shown by a dotted line in the drawing), and the refractive index profile of the optical fiber preform 46 obtained from the porous silica preform 41 of Example 5 (shown by a solid line in the drawing) are shown.

was less than 0.2, the outer deposition region 54 became too thin. Therefore, soot breakage could not be suppressed satisfactorily. Therefore, soot breakage was observed in one of three porous silica preforms 41 fabricated.

Figure 9:
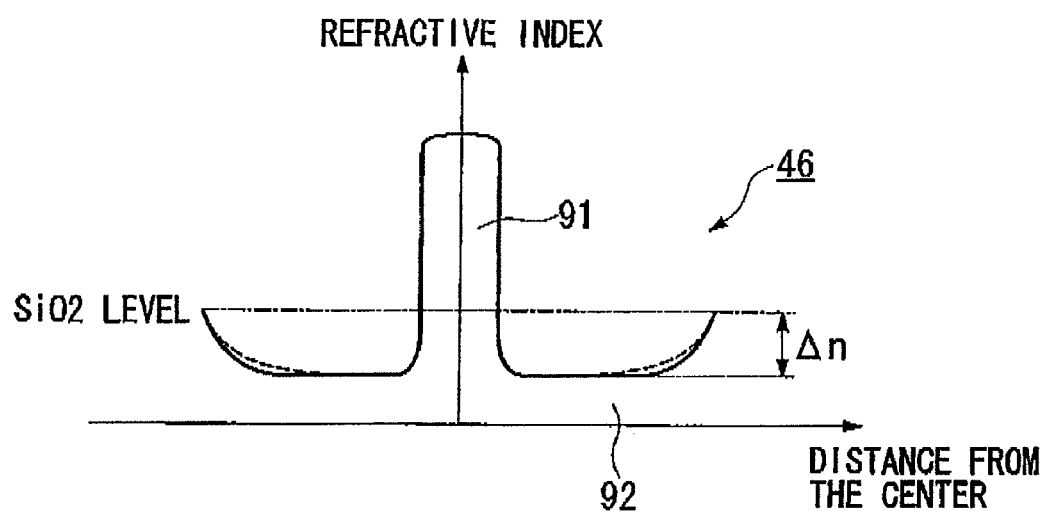
FIG. 9 is a diagram illustrating refractive index profile of an optical fiber preform fabricated using a porous silica preform of Example 8.

In Example 8, since the ratio of the volume of the outer deposition region 54 to the volume of the cladding region 52 (the amount of deposited fluorine-doped glass particles α) was more than 1.0, the outer deposition region 54 became too thick. Therefore, fluorine in fluorine-containing glass particles α were not distributed in the outer deposition region 54 during dehydration and vitrification treatments. As shown by a dotted line in FIG. 9, a refractive index profile comparable to that of Example 5 could not be obtained since the fluorine concentration at the outer periphery of the cladding 92 was low and the refractive index does not decrease satisfactorily.

In Example 9, since the powder density of the outer deposition region 54 is lower than 0.15 g/cm$^3$, the outer deposition region 54 was fragile, and soot breakage could not be suppressed satisfactorily. Therefore, soot breakage occurred in two of five porous silica preforms 41 fabricated.

In contrast, in Example 10, the powder density of the outer deposition region 54 was sufficiently large with 0.15 g/cm$^3$, and this dense and solid outer deposition region further prevents soot breakage of the outer deposition region 54. No porous silica preforms 41 experienced soot breakage.

In Examples 11 and 12, instead of supplying SiCl$_4$ to respective nozzles, and CF$_4$ gas and hydrogen gas were mixed together and were supplied to a single nozzle. In the oxyhydrogen flame, SiO$_2$ is exposed to Gas B at a high temperature immediately after SiO$_2$ is generated. As a result, a large amount of SiF$_4$ is generated, and the adhesion force between glass particles is significantly weak.

Soot breakage occurred in all of the porous silica preforms 41 in Example 11 and in five of six porous silica preforms 41 in Example 12.

In contrast, since SiCl$_4$ gas was supplied to and jetted from a single nozzle after it was mixed with argon gas in Example 5, soot breakage could be prevented as compared to Examples 11 and 12.

According to the first embodiment of the method for fabricating a porous silica preform of the first aspect of the present invention, it is possible to make glass particles strongly adhere to a starting rod, which reduces the incidence of falling off of the porous silica preform and improves the yield.

According to the second embodiment of the method for fabricating a porous silica preform of the first aspect of the present invention, the adhesion force between glass particles can be reinforced, which reduces the incidence of soot breakage of silica particles and improves the yield According to the third embodiment of the method for fabricating a porous silica preform to the first aspect of the present invention, decrease in the adhesion force between glass particles is controlled by forming a hardened layer and the solid hardened layer having a high powder density can be formed. The inner portion of the porous silica preform is protected by the hardened layer, which suppresses soot breakage and cracking at the tail of the porous silica preform when the porous silica preform is cooled after fabricated, and yield can be improved.

According to the first embodiment of the method for fabricating a porous silica preform of the second aspect of the present invention, the surface of a porous silica preform can be coated with the outer deposition region having superior adhesion force, thus, breakage (soot breakage) of the porous silica preform can be suppressed.

In particular, the inner burner and the outer burner are arranged at the direction of shift of the starting rod, i.e., longitudinally, and while the starting rod is moved longitudinally, and glass particles α are deposited for forming the core region and the cladding region using the inner burner. At the same time, glass particles β are deposited for forming the outer deposition region using the outer burner. Thus, glass particles β can be deposited on the glass particles α immediately after glass particles α are deposited.

According to the second embodiment of the method for fabricating a porous silica preform of the second aspect of the present invention, the etching reaction can be suppressed and the adhesion force between glass particles is maintained strong. Thus, glass particles having strong adhesion force can be generated and be deposited on a starting rod. Thus, incidence of breakage (soot breakage) of the porous silica preform can be suppressed.

According to the porous silica preform of the second aspect of the present invention, since the surface of the porous silica preform is coated with the outer deposition region having an excellent adhesion force, for example, when an optical fiber preform is fabricated from this porous silica preform and breakage due to impacts to the porous silica preform can be suppressed. The handling during transportation and the like become easy, breakage is suppressed, and yield can be improved.

According to the present invention, a fluorine-containing porous silica preform with little breakage can be fabricated, and the present invention can be applied to a fabrication process for a porous silica preform using the VAD (Vapor-phase Axial Deposition), or OVD (Outside Vapor Deposition) method.

Furthermore, the present invention can be applied to a case in which an element other than fluorine which easily causes soot breakage is used, and it can be used as a method which can prevent soot breakage and obtain a high yield.

According to the present invention, a fluorine-containing porous silica preform with low incidence of breakage can be fabricated even when fluorine is doped at a high concentration, and the present invention can be applied to a fabrication process for a porous silica preform using the VAD (Vapor-phase Axial Deposition), or OVD (Outside Vapor Deposition) method. Furthermore, the present invention can be applied to a case in which an element other than fluorine which easily causes soot breakage is used, and it can be used as a method which can prevent soot breakage and obtains high yield.

While preferred embodiments of the invention have been described and illustrated above, it should be understood that these are examples of the invention and are not to be limited. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A method for fabricating a porous silica preform having a core region and a cladding region, comprising:
   a step of, when depositing glass particles to be an effective region of the porous silica preform, while a starting rod is rotated about its axis and shifted upward, supplying gas-A containing silicon to a core burner to obtain glass particles for core, depositing the glass particles for core on a lower portion of the starting rod in the vertical direction to form the core region, supplying the gas-A containing silicon and gas-B containing fluorine to a cladding burner so that a ratio of the number of fluorine atoms to the number of silicon atoms satisfies the following Formula (3) to obtain glass particles for cladding, and depositing the glass particles for cladding around the core region to form the cladding region:

$$\{(\text{number of F atoms})/(\text{number of Si atoms})\} > 0.3 \quad (3); \text{ and}$$

a step of, when forming a tail of the porous silica preform below the effective region after depositing the glass particles to be the effective region of the porous silica preform, while the starting rod is rotated about its axis and shifted upward, forming a hardened layer which has a high powder density by supplying the gas-A containing silicon and the gas-B containing fluorine to the cladding burner so that a ratio of the number of fluorine atoms to the number of silicon atoms satisfies the following Formula (2) and increasing the temperature of the flame of the cladding burner to obtain glass particles which are used to form the hardened layer, and depositing the glass particles which are used to form the hardened layer below the effective region:

$$\{(\text{number of F atoms})/(\text{number of Si atoms})\} < 0.3 \quad (2).$$

* * * * *